US010821825B2

(12) United States Patent
Sohier (10) Patent No.: US 10,821,825 B2
(45) Date of Patent: Nov. 3, 2020

(54) TRACKER HYDRAULIC ASSISTANCE DEVICE FOR A SLAVE CRAFT (71) Applicant: POCLAIN HYDRAULICS INDUSTRIE, Verberie (FR)

(72) Inventor: Vincent Sohier, Verberie (FR)

(73) Assignee: POCLAIN HYDRAULICS INDUSTRIE, Verberie (FR)

(*) Notice: Subject to any disclaimer, the term of this patent is extended or adjusted under 35 U.S.C. 154(b) by 0 days.

(21) Appl. No.: 16/472,566

(22) PCT Filed: Dec. 22, 2017

(86) PCT No.: PCT/EP2017/084505
§ 371 (c)(1),
(2) Date: Jun. 21, 2019

(87) PCT Pub. No.: WO2018/115496
PCT Pub. Date: Jun. 28, 2018

(65) Prior Publication Data
US 2019/0322167 A1    Oct. 24, 2019

(30) Foreign Application Priority Data
Dec. 22, 2016 (FR) ..................... 16 63238

(51) Int. Cl.
*F16H 61/431* (2010.01)
*B60K 7/00* (2006.01)
(Continued)

(52) U.S. Cl.
CPC .......... *B60K 7/0015* (2013.01); *B60K 17/356* (2013.01); *F16H 61/431* (2013.01); *F16H 61/433* (2013.01); *B60Y 2200/147* (2013.01)

(58) Field of Classification Search
CPC .... B60K 7/0015; F16H 61/431; F16H 61/433
See application file for complete search history.

(56) References Cited

U.S. PATENT DOCUMENTS

| 5,184,466 A * | 2/1993 | Schniederjan ........ F16H 61/421 |
| | | 60/448 |
| 8,024,925 B2 * | 9/2011 | Cronin .................. F16H 61/472 |
| | | 60/451 |

(Continued)

FOREIGN PATENT DOCUMENTS

| DE | 2150571 A1 | 6/1973 |
| DE | 3809869 A1 | 10/1989 |

(Continued)

OTHER PUBLICATIONS

International Preliminary Report on Patentability received for PCT Patent Application No. PCT/EP2017/084505, dated Jul. 4, 2019, 11 pages (6 pages of English Translation and 5 pages of Original Document).

(Continued)

*Primary Examiner* — Thomas E Lazo
(74) *Attorney, Agent, or Firm* — Womble Bond Dickinson (US) LLP (57) ABSTRACT

The invention relates to a hydraulic assistance device comprising: a hydraulic machine (30) capable of driving a wheel (W) of the craft; a variable displacement pump (10) comprising a double-acting actuator (12) defining two control chambers (12 a, 12 b) for hydraulically controlling the capacity of said pump (10); two supply lines (40a, 40 b) that connect the hydraulic machine (30) and the variable displacement pump (30) in order to form a closed circuit, characterised in that the device further comprises: two control lines (80a, 80 b), each being respectively drawn from one of the two supply lines (40a, 40 b) and being configured to respectively supply one of the two control chambers (12a, 12 b); two electrically calibratable pressure limiters (90a, 90 b) respectively disposed on the two control lines (80a, 80 b).

23 Claims, 7 Drawing Sheets

(51) Int. Cl.
    *B60K 17/356*   (2006.01)
    *F16H 61/433*   (2010.01)

(56) References Cited

U.S. PATENT DOCUMENTS

| | | | | |
|---|---|---|---|---|
| 9,850,921 | B2* | 12/2017 | Thoms | F15B 15/00 |
| 2016/0046269 | A1* | 2/2016 | Prigent | B60T 11/103 |
| | | | | 60/327 |

FOREIGN PATENT DOCUMENTS

| | | | |
|---|---|---|---|
| DE | 102007051185 | A1 | 4/2009 |
| DE | 102016000946 | A1 | 8/2016 |
| EP | 2551524 | A1 | 1/2013 |
| FR | 2935128 | A1 | 2/2010 |
| FR | 3004148 | A1 | 10/2014 |
| WO | 2014/016304 | A1 | 1/2014 |

OTHER PUBLICATIONS

International Search Report and Written Opinion received for PCT Patent Application No. PCT/EP2017/084505, dated Mar. 28, 2018, 15 pages (7 pages of English Translation and 8 pages of Original Document).

Preliminary Research Report and Written Opinion received for French Application No. 1663238, dated Aug. 31, 2017, 6 pages (1 page of French Translation Cover Sheet and 5 pages of original document).

\* cited by examiner

TRACKER HYDRAULIC ASSISTANCE DEVICE FOR A SLAVE CRAFT

GENERAL TECHNICAL FIELD

The invention relates to the field of hydraulic assistance on follower vehicles, that is to say, vehicles driven by another vehicle.

In this text, slave vehicles and master vehicles, connected by a coupling or a chassis are mentioned. By definition, the speed of the slave vehicle is determined by that of the master vehicle. The master vehicle and the slave vehicle can be two axles of a same vehicle, or a vehicle and a trailer that is coupled thereto. A slave axle is also mechanically linked or coupled to the machine or vehicle that bears the master axle.

More specifically, the invention relates to managing the displacement of a variable displacement pump integrated into a hydraulic assistance circuit of the slave vehicle.

STATE OF THE ART

Some hydraulic assistance circuits are supplied by a variable displacement pump, whereof the displacement can be piloted hydraulically, for example by varying the inclination of a plate whereon circularly arranged pistons slide, thus, making the volume of their respective chamber vary. Monitoring displacement is generally carried out by a double acting actuator defining two control chambers, to pilot the pump displacement in one direction or the other.

The adjustment of the displacement allows to manage the quantity of oil transferred to one or several hydraulic machines mounted on at least one wheel or one axle of the slave vehicle, via two supply lines which connect the pump and the hydraulic machine. The hydraulic machines can operate as an engine or a pump.

This displacement management is an essential element of the good operating of the master/slave couple. In fact, the constraints of a slave vehicle are distinct from a master vehicle. For example, if too much oil is transferred to the hydraulic machine operating as an engine, and as the engine speed of rotation cannot increase as it is determined by the speed of the master vehicle, the pressure increases at the engine terminals and the slave vehicle risks providing too much torque, thereby, disrupting the control of the master vehicle.

Conversely, if not enough oil is transferred to the hydraulic engine, the opposite effect occurs and the engine will generate a resisting torque, thereby, slowing down the master vehicle.

The slave vehicle should ideally be able to operate according to the four quadrants, that is to say in forward gear and in thrust, in forward gear and in retention, in reverse gear and in thrust and in reverse gear and in retention.

The gear direction depends on the direction of the flow and the direction of torque contribution of the pressure variation sign at the terminals of the hydraulic machine.

It is known to manage pump displacement by using a booster pump, which is a pump typically provided in the field of hydraulic assistance to boost the circuits with oil and compensate for the necessary or involuntary circuit leaks. The booster pump generally operates between 10 and 20 bars.

Document EP2551524, although it does not relate to slave vehicles, describes such a solution. The booster pump manages the two chambers of the double acting actuator. The system further comprises a safety flow limiter which discharges the surplus pressure of one of the supply lines of the hydraulic engine in the double acting actuator to make the pump displacement drop and thereby, limit the surplus in the hydraulic circuit.

Document WO201416304 uses a booster pump, which, this time supplies only one of the two chambers of the double acting actuator. The other chamber is supplied by the highest pressure of the two supply lines via an electrically calibratable pressure limiter. Thus, a balance is exerted between the two pressures to manage the pump displacement.

However, these solutions do not allow obtaining a sufficiently efficient displacement follow-up effect. Particularly, if the pressure in one of the supply lines is subjected to an unexpected variation, the repercussion regarding displacement management is not necessarily carried out and the master/slave vehicle control can be disrupted.

PRESENTATION OF THE INVENTION

In order to resolve the aforementioned limitations, the invention proposes a hydraulic assistance device, for example of a slave vehicle, comprising:
- a hydraulic machine, capable of motorising a wheel of the vehicle,
- a variable displacement pump, comprising a double actuating actuator defining two control chambers, to hydraulically pilot the displacement of said pump,
- two supply lines, connecting the hydraulic machine and the variable displacement pump to form a closed circuit, characterised in that the device further comprises:
- two control lines, each being sampled respectively from one of the two supply lines and being configured to respectively supply one of the two control chambers,
- two electrically calibratable pressure limiters respectively arranged on the two control lines.

Particularly, the pressure limiters are configured so that the two chambers of the double acting actuator are simultaneously put under pressure from the two supply lines respectively. In other words, the pressure limiters are configured so that the double acting actuator is piloted by the two control lines at the same time. This means that the two pressure limiters are calibrated to let the pressurised oil go through simultaneously.

Advantageously, the two pressure limiters are calibratable starting from a value ranging between 0 and 5 bars and preferably starting from 0 bar.

Advantageously, the pressure limiters are calibrated at their minimum value when they are not piloted electrically.

Advantageously, the control lines each comprise a sampling nozzle upstream of the pressure limiters so that the control lines carry out a tapping on the supply lines. These nozzles help make the pressure drop in the control chambers in the absence of oil input.

Advantageously, the control lines each comprise a leakage nozzle downstream of the pressure limiter, connected to a tank via a tapping, particularly for damping pressure variations within the system. The sampling nozzles create a nozzle bridge allowing limiting the involved pressures and creating an oil flow that generates pressures.

The variable displacement pump is generally driven by a power take-off.

The hydraulic assistance device advantageously further comprises an engagement valve, arranged on the supply lines to clutch or unclutch the hydraulic machine.

The hydraulic assistance device further generally comprises a booster pump and a control valve, adapted to hydraulically pilot the engagement valve from the pressure of the booster pump.

The hydraulic assistance device advantageously comprises a computing unit, said computing unit allowing to pilot the electrically calibratable flow limiters.

Advantageously, the computing unit is configured to pilot the pressure limiter connected to the highest pressure supply line between the two supply lines.

Advantageously, the computing unit is configured to simultaneously pilot the two pressure limiters or to simultaneously not pilot the two pressure limiters.

The invention also relates to a vehicle comprising a device such as described before.

The invention also relates to a pair of vehicles comprising a master vehicle to which is attached the aforementioned slave vehicle. The master vehicle and the slave vehicle can be two axles of a same vehicle or two vehicles coupled by a coupling.

The master engine can comprise a power take-off to supply the variable displacement hydraulic pump of the slave vehicle.

The invention also proposes a hydraulic assistance method using a device, of a vehicle, or a pair of vehicles such as described beforehand. The method comprises the following step of piloting at least one of the electrically calibratable pressure limiters.

Advantageously, the method comprises the following steps:
unpiloting the two pressure limiters,
clutching the hydraulic machine,
piloting only one of the two pressure limiters.

Advantageously, the choice of the pressure limiter to calibrate is performed based on the data obtained by a sensor. The sensor can be a force sensor, an inclinometer sensor, a rolling direction sensor and/or a force direction sensor.

PRESENTATION OF THE FIGURES

Other characteristics, purposes and advantages of the invention will become apparent in light of the following description, which is purely illustrative, and non-limiting, and which should be read in comparison with the accompanying drawings, on which.

DETAILED DESCRIPTION

Figure 1:
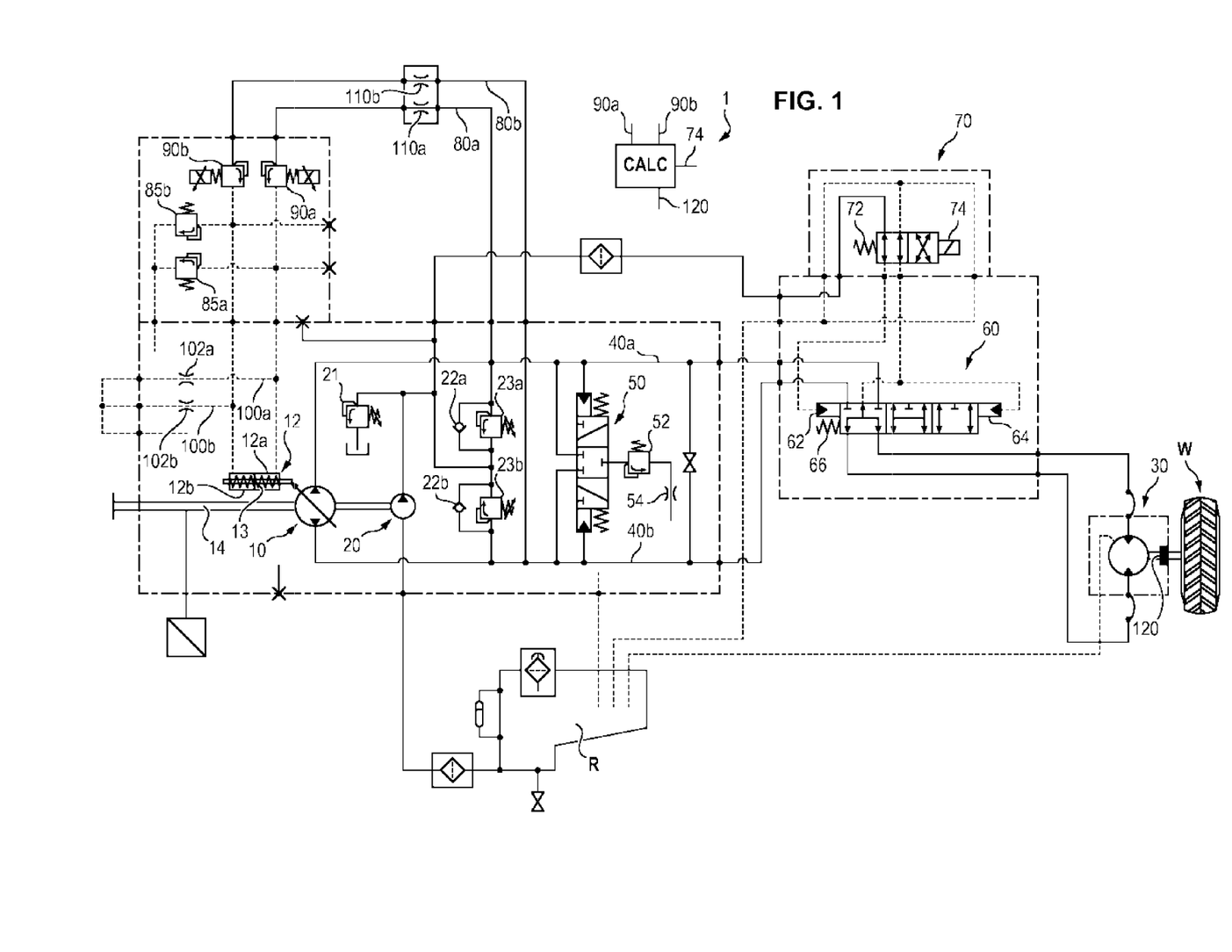
FIG. 1 represents a circuit in compliance with an embodiment of the invention.

In reference to FIG. 1, a hydraulic assistance device 1 in compliance with an embodiment shall be described. This device is mounted on a slave vehicle 2 such as described in the introduction.

The hydraulic device comprises a variable displacement pump 10. The pump 10 can have a positive or a negative flow, that is to say, that its intake can become its discharge and vice versa. The displacement is hydraulically piloted by means of a double acting actuator 12 comprising two control chambers 12a, 12b. The pressure is called respectively Pa and Pb in the first chamber 12a and the second chamber 12b respectively. If the pressure Pa is higher, respectively lower, than the pressure Pb, the pump 10 switches to maximum negative displacement, respectively to maximum positive displacement. A null displacement is obtained by balancing the forces within the double acting actuator 12.

By defining, $\Delta P = Pb - Pa$, the displacement is negative if $\Delta P$ is negative and the displacement is positive if $\Delta P$ is positive.

For example, the double acting actuator 12 pilots the inclination of a plate. Typically, it is piloted with pressures ranging between 10 and 25 bars. Return means 13 can maintain the actuator 12 in a neutral position, that is to say, that the pump 10 thus, has a null displacement. It is particularly the force of these return means 13 that should overcome the aforementioned pressures. The return means 13 in particular allow a return to a zero flow of the pump in the event of electrical failure.

A value of $|\Delta P|$=approximately 16 bars is frequently used.

The pump 10 can also operate as an engine.

The pump 10 is driven by a power take-off 14 coming from a master vehicle 3 (incorrectly referenced on the figures, which only represent the slave vehicle).

The power take-off 14 generally drives another pump 20, called booster pump, which acts to ensure the presence of oil in the circuits and to pilot certain valves. The booster pump 20 operates at a booster pressure Pg at around 10 to 20 bars.

The booster pump 20 collects the oil in a tank R, which is at a pressure qualified as zero, acting as an oil reserve.

The hydraulic device further comprises a hydraulic machine 30 which enables to motorise the slave vehicle, for example at a wheel R. The hydraulic machine 30 can operate as a pump or an engine.

The pump 10 and the hydraulic machine 30 are connected together by two supply lines 40a, 40b forming a closed circuit (there will be mention of a first line 40a and a second line 40b). Each supply line 40a, 40b can be high or low pressure.

The presented device operates according to the four quadrants presented in the introduction. The flow in the supply lines 40a, 40b can hence, be reversed.

The booster system, widely known, is typically fitted with a safety pressure limiter 21 for the overload, which defines the maximum booster pressure and two booster valves supplied by the booster pump 20, in the form of check valves 22a, 22b for each of the supply lines 40a, 40b.

A protection against overpressure in each branch of the closed loop is provided in the form of safety pressure limiters 23a, 23b, for each of the supply lines 40a, 40b. In a manner known per se, the pressure limiters 23a, 23b are coupled with booster valves 22a, 22b and in the event of overpressure, the limiters 23a, 23b discharge the oil in the opposite direction towards the booster circuit, and the excess pressure is discharged by the pressure limiter 21 of the booster circuit.

An oil change system is provided by means of a low pressure selector 50 between the two supply lines 40a, 40b, coupled to a pressure limiter 52 and a restriction 54. The leakage losses passing through the restriction 54 return to the tank R. This optional assembly known per se, serves to discharge hot oil from the closed loop, only from the supply line at the lowest pressure, thereby, allowing the same amount of fresh oil to enter from the booster and hence, limit the overheating of the oil contained in the closed circuit.

This hot oil pours into the casing of the pump represented in dotted lines, and a drain outlet collects these leakages, and sends them back to the tank R. A non-represented heat exchanger can be placed on this line to cool the oil.

In order to allow the activation or deactivation of the hydraulic assistance, an engagement valve 60 is provided on the supply lines 40a, 40b. This valve comprises at least two positions: in a free wheel position, the hydraulic machine 30 runs empty and, in an assistance position, the supply lines 40a, 40b are connected to the hydraulic machine 30. An intermediate, transition position, can be provided, wherein the two supply lines 40a, 40b are connected together, as well as connecting the pump 10 to the hydraulic machine 30 to limit the surges.

An actuator 62, piloted hydraulically, places the valve in free wheel position and another actuator 64, piloted hydraulically, places the engagement valve 60 in assistance position. Return means 66, which push in the same direction as the actuator 62, allow switching to intermediate position for a relatively short time period.

A control valve 70 hydraulically pilots the engagement valve 60 by means of the pressure originating from the booster pump 20. In a default position, the booster pressure is transferred towards the actuator 62 and the hydraulic machine 30 is emptied by connecting it at a tank pressure. In a piloted position, the booster pressure is transferred towards the actuator 64 and the hydraulic machine 30 is supplied with pressurised oil.

The return means 66 enable to slow down the change in position of the engagement valve 60 and thus, place the engagement valve 60 in intermediate position. The intermediate position can be a fugitive position. The movement is carried out in two stages: in the first stage the filling of the feed and return lines of the machine 30, then exit of the pistons, and only when the pistons are pressing on the cam, does a pressure rise occur in these lines, allowing the switching of the drawer of the valve 60 for the lines 40a, 40b to communicate with the engine 30. The control valve 70 comprises return means 72, to maintain the valve in default position and comprises an electrical actuator 74, to pilot the valve.

The control valve 70 is typically electrically piloted by a computing unit CALC. The control valve 70 is typically a two-position four-way valve.

Alternatively, the engagement valve 60 can be piloted electrically (the actuators 62, 64 are piloted electrically) or pneumatically (the actuators 62, 64 are piloted pneumatically, that is to say, with compressed air pressure).

The device further comprises a first control line 80a which connects the first supply line 40a to the first chamber 12a of the double acting actuator 12. Similarly, a second control line 80b connects the second supply line 40b to the second chamber 12b.

On each of the control lines 80a, 80b an electrically calibratable pressure limiter 90a, 90b is provided. The calibration is piloted by the computing unit CALC, which can either be on the slave vehicle 2, or on the master vehicle 3.

The pressure limiters 90a, 90b allow controlling the pressure level in the respective control chambers 12a, 12b. Piloting the double acting actuator 12 is hence, only performed with pressures originating from the supply lines 40a, 40b. The booster pump 20 does not act directly anymore, particularly when the assistance device is activated and that the pressures in the supply lines 40a, 40b do not originate from the boosting by the booster pump 20.

More specifically, the pressure limiters 90a, 90b are calibrated such that the two control chambers 12a, 12b of the double acting actuator 12 can be simultaneously pressurised from the two supply lines 40a, 40b. In other words, the two pressure limiters 90a, 90b can let oil pass simultaneously.

Due to the presence of the booster pump 20, the pressure in the supply lines 40a, 40b is at least equal to the booster pressure Pg, at the very least when the hydraulic circuit is activated. For the displacement of the pump 10 to be adjusted, the pressure originating from the supply lines 40a, 40b should be able to pass through the pressure limiters 90a or 90b. Therefore, the pressure limiters 90a, 90b are calibratable at a minimum value lower than the booster pressure, and preferably lower, so that the pressure Pa or Pb crossing one of the limiters 90a, 90b can be equal to the necessary pressure (in the case where the other limiter is blocking) allowing maximum (or minimum) displacement control. In a preferred embodiment, the pressure limiters 90a, 90b are calibratable starting from a value ranging between 0 and 5 bars.

Similarly, they are calibratable up to 100 bars, or even 200 bars, or even 300 bars. This means that they can scan the entire pressure range of the supply lines. A limiter calibrated at 0 bar is a passing limiter but in practice, when the electrical control requires 0 bar, the inner components of the limiter will cause an inevitable head loss (of the order of a few bars).

A pressure limiter allows a flow to pass when the pressure upstream reaches its calibrated pressure. For example, a flow limiter calibrated at 20 bars, allows a pressure higher than or equal to 20 bars to pass. The pressure downstream of the limiter is thus, equal to the pressure upstream minus the calibrating pressure.

As pressures can reach 400 bars in the supply circuits, several systems are provided to limit the pressure in the control chambers 12a, 12b. Particularly, two safety pressure limiters 85a, 85b are arranged on the respective control lines 12a, 12b, between the control chambers 12a, 12b and the calibratable pressure limiters 90a, 90b. The safety pressure limiters 85a, 85b are hence, typically calibrated at values of 30 to 50 bars. They are useful for rapid relieving on a line 100a, 100b and bearing in mind that the flow cannot exit backwards by the limiters 90a, 90b. This hence, allows the control drawer 13 to return backwards rapidly. The limiters 85a, 85b have no functional role to play within the context of the invention, with some exceptions.

So that, in the absence of a pressure application coming from the pressure limiters, the chambers 12a, 12b are no longer controlled, the control lines 80a, 80b are each fitted downstream of the calibratable pressure limiters 90a, 90b with a tapping 100a, 100b with nozzle 102a, 102b which pours into the tank R. As a result, the pressure in said control line 80a, 80b drops once again in the case where the associated pressure limiter 90a, 90b is blocking. Furthermore, these nozzles 102a, 102b allow establishing a low flow of oil, which enables to create a pressure in the lines 100a, 100b.

In order to prevent oscillation or pump phenomena, sampling nozzles 110a, 110b are provided on the control lines 80a, 80b upstream of the calibratable limiters 90a, 90b. These nozzles 110a, 110b thus, allow to perform a tapping on the supply lines 40a, 40b. These nozzles also have a dynamic damping role for the stability of the system, by preventing rapid flow variations.

Furthermore, coupled with the leakage nozzles 102a, 102b, they allow achieving a nozzle bridge allowing to work on a pressure generated by an oil flow and also to make the intermediate pressure drop. This prevents to make the valves and other vehicles work at the pressure values of the supply lines 40a, 40, but at lesser values. The working pressure for controlling the pump displacement being generally lower than 20 bars, it is not necessary that the pressures in the control lines 80a, 80b reach high values.

The dimensioning of torque restrictions 102a, 110a and 102b/110b allows controlling the parameters of the device as regards the displacement of the double acting actuator and the pressures in the control lines 80a, 80b between the nozzle bridge.

In an embodiment, the diameter of the nozzles 102a, 102b is of 0.67 mm and the diameter of the nozzles 110a, 110b is of 0.9 mm. This allows having a pressure Pa or Pb of about 16 bars.

Figure 2:
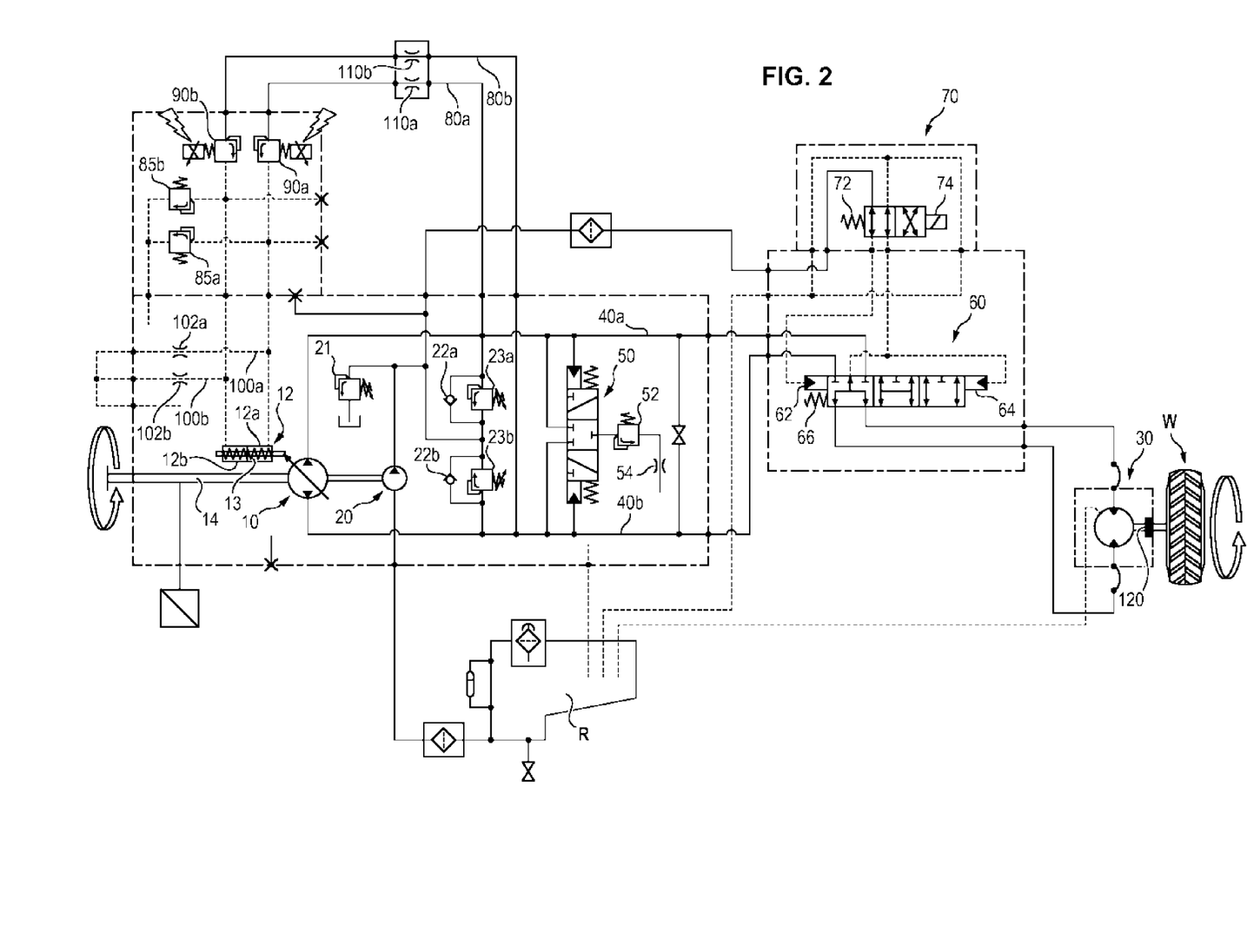
FIGS. 2 to 3 illustrate different operating moments of the circuit in compliance with an embodiment of the invention.

FIG. 2 illustrates the starting of the device 1.

The circuit is pressurised by means of the booster pump 20. At this stage, the pump 10 should not yet flow: for this the pressure Pa, Pb in the two control chambers 12a, 12b should be identical. For that, two options are possible.

Either, as illustrated with thunderbolts on FIG. 2, the two limiters 90a, 90b are piloted electrically to be overcalibrated, that is to say, calibrated beyond the pressure in the supply lines (in this case the booster pressure Pg), such that the pressure downstream of the limiters 90a, 90b is zero.

Or the two limiters 90a, 90b are unpiloted, and both let pass the same pressure, which is the booster pressure Pg minus the minimum calibrating value of the limiters 90a, 90b in the absence of piloting. Preferably, as mentioned before, the limiters have a minimum calibrating value of 0 bars. As a result, the pressure in the two control chambers 12a, 12b ranges between 0 (except for the head losses inherent to the limiters 90a, 90b) and the booster pressure (except for the same head losses and the nozzles 100a, 110b).

If ever there is a slight pressure deviation (due to the head losses of the different components), for example a slight overpressure in the second supply line 80b, we have $\Delta P>0$ hence the pump 10 will switch to positive displacement and make the oil flow in the first supply line 40a. As the engagement valve 60 is in the no-load position, an overpressure will be created in the supply line 40a and this overpressure will be transferred via the limiter 90a. The pressure Pa in the control chamber 12a increases and will then equalise that Pb of the chamber 12b, which tends to make the displacement of the pump 10 drop. Once the displacement is back to 0 ($\Delta P>0$), the pump no longer flows and the overpressure in the supply line 40b disappears: the system naturally balances itself towards a zero flow.

In this configuration, the power take-off 14 can run without the pump 10 necessarily flowing and the hydraulic machine 30 can run empty, without generating torque. The slave vehicle 2 can be displaced freely.

Figure 3:
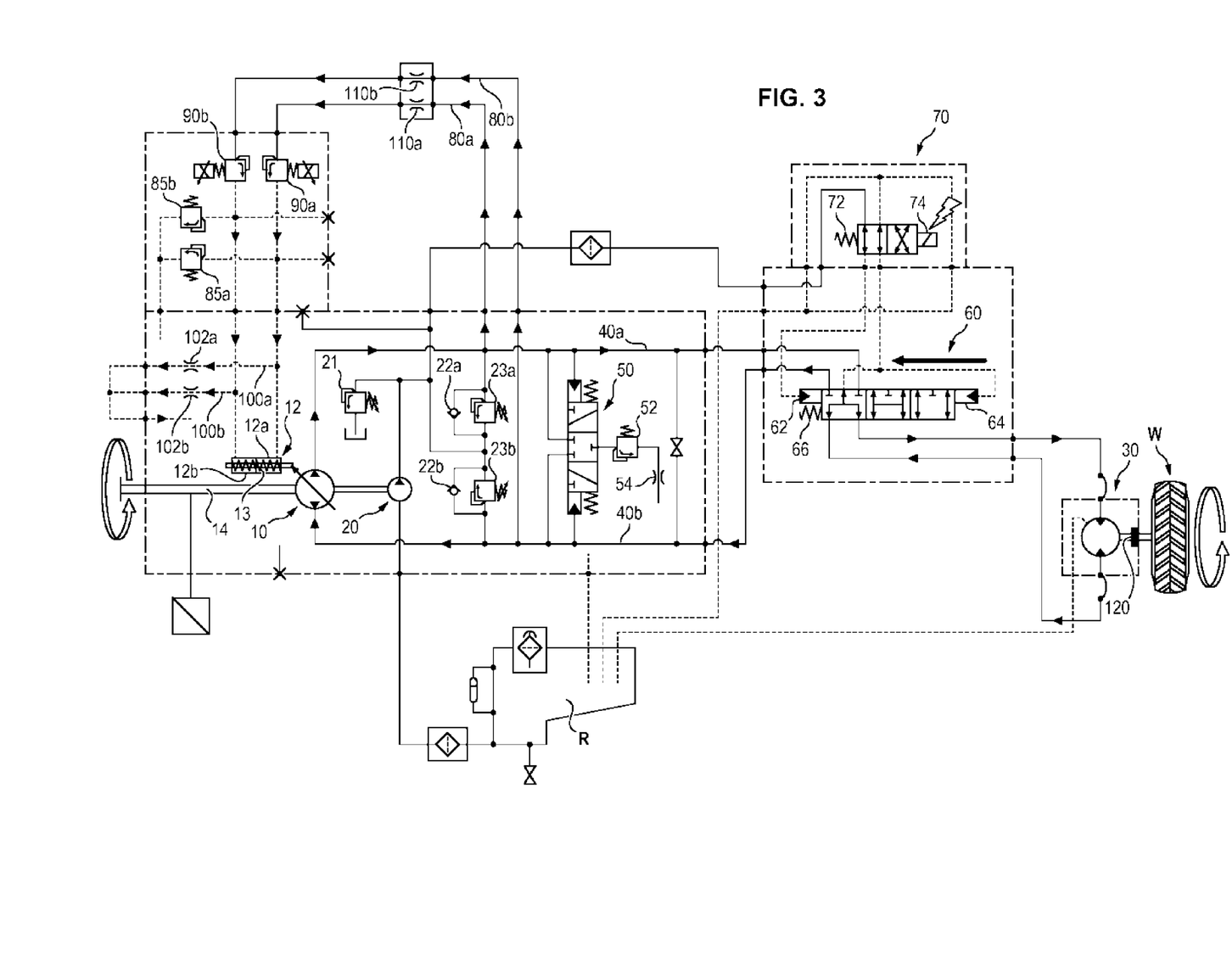

If it is required to use the hydraulic machine 30, the control valve 70 is piloted by the computing unit CALC, thus, causing the interlocking of the engagement valve 60, as illustrated with the thunderbolt and the arrow on FIG. 3. If no torque is required, the two limiters 90a, 90b are not piloted. The pump 10 and the hydraulic machine 30 are thus meshed.

If the slave vehicle is displaced, for example towards the front, then the hydraulic machine 30 pumps oil and creates a slight overpressure, respectively a very slight vacuum, in the second supply line 40b, respectively the first supply line 40a (the hydraulic machine 30 temporarily becomes a hydraulic pump). As a result, the pressure limiter 90b transfers part of the overpressure to the second control chamber 90b, which tends to positively increase the displacement (we have Pb which increases hence, we have a $\Delta P>0$): an oil flow is generated, which injects oil in the first vacuum supply line 40a, thus, reducing the pressure variation between the two supply lines 40a, 40b. This pressure variation is directly translated at the control chambers 12a, 12b (it is worth noting that the limiters 90a, 90b are not piloted) which tend to find a balance so that the flow of the pump 10 follows the flow of the engine 30. The flow of the pump 10 hence, follows the flow imposed by the machine 30, without a substantial torque being provided.

This principle operates identically in forward and in reverse gear.

In practice, the pump switches over for a pressure of 3 to 15 bars, thereby, the delta pressure stabilises at this value. With the presence of the spring 13, the $\Delta P$ between the first chamber 12a and the second chamber 12b varies between 3 and 12 bars, at a pump displacement corresponding to a $\Delta P$ on the control, corresponding to a position of the pump plate.

Figures 4A, 4B:
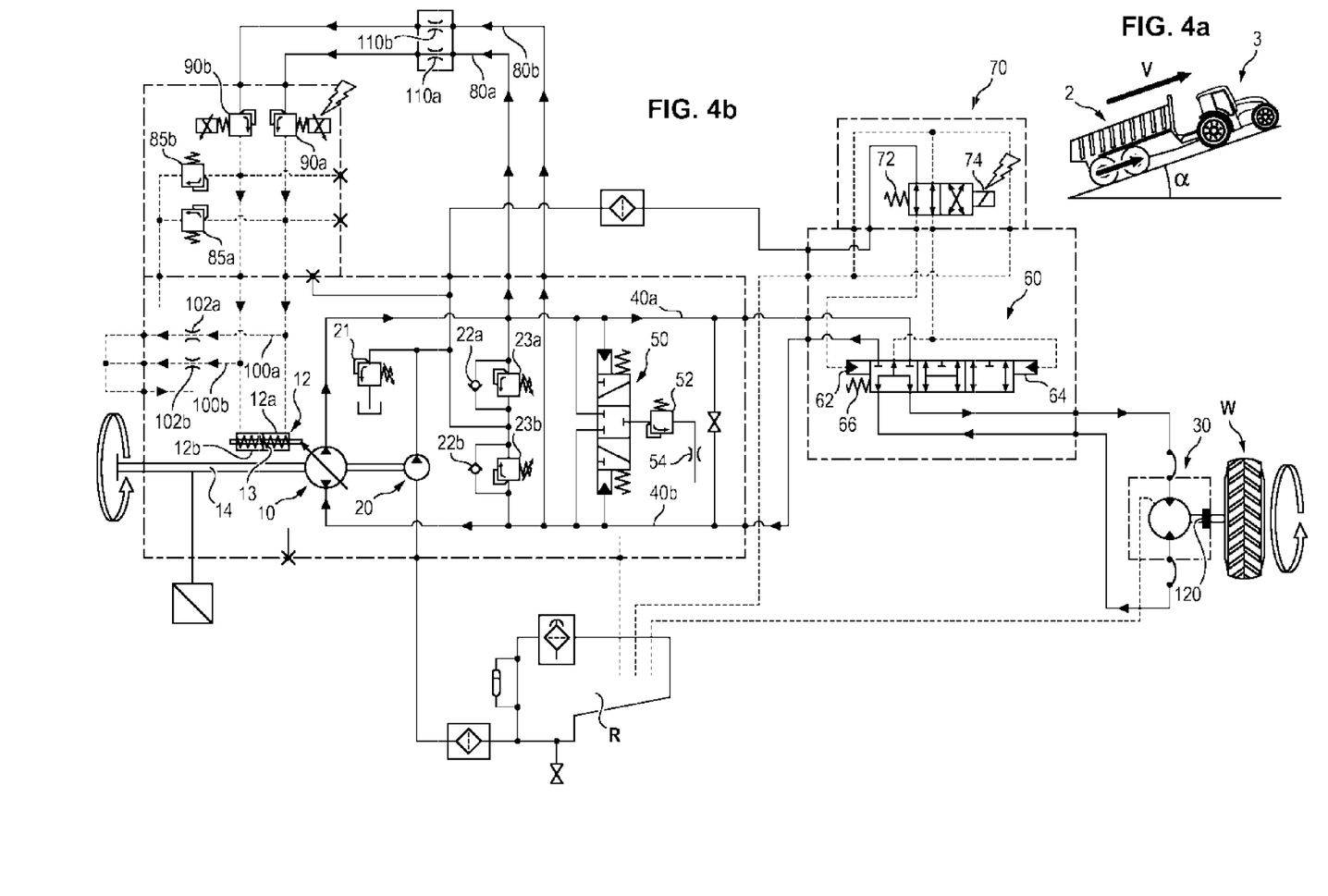
FIGS. 4a and 4b, 5a and 5b, 6a and 6b, 7a and 7b, illustrate the situation of the two vehicles and the circuit operating, respectively in forward gear and torque contribution, reverse gear and torque contribution, forward gear and in retention, reverse gear and in retention (the arrows on the hydraulic lines indicating the direction of the flow).

Now, different case in points wherein the hydraulic assistance is required shall be described on FIGS. 4a/4b to 7a/7b.

On FIG. 4a is illustrated a slave vehicle 2 and a master vehicle 3 in forward gear and in ascent. In this situation, it is required that the hydraulic machine 30 operates as an engine and provides torque to the wheels.

For this, as illustrated on FIG. 4b, the pressure limiter 90a of the first supply line 40a is calibrated by the computing unit CALC at a specific value, which directly determines the torque required for the wheels. The other limiter 90b is decalibrated.

By increasing the calibration of the limiter 90a, the pressure Pa in the first control chamber 12a decreases (it is worth noting that, the pressure downstream of the limiter corresponds to the pressure upstream minus the calibration value, modulo the nozzle bridge) and becomes lower than the pressure Pb in the second control chamber 12b. As a result, the pump 10 displacement tends to increase. As the speed of the engine 30 is determined by the speed of the master vehicle, the result of the displacement increase is the creation of overpressure in the first supply line 40a, thus, creating a pressure variation at the terminals of the engine 30 and hence, a torque contribution to the wheels.

The overpressure in the first supply line 40a increases until the pressures of the control chambers 12a and 12b reach a break-even point such that the pump 10 flow allows maintaining the required pressure in the line 40a or 40b. As the flow stabilises, the pressure variation between the two supply lines 40a, 40b stabilises too, such that $\Delta P$ also stabilises, in turn stabilising the flow. In as far as the pressure Pa in the first control chamber 12a depending on the pressure in the first supply line 40a directly depends on the calibrating value of the limiter 90a, the calibrating value of the limiter 90a allows regulating the torque value to be contributed.

If the chosen calibrating value makes the required engine torque very high, the pressure is relieved via the safety pressure limiters 23, or the wheels W shall slide (loss of adhesion, skidding). The maximum calibration can be chosen electronically, for example according to the type of equipped machine, and/or according to adhesion conditions that can be used as input data (speed sensors and/or calibration selector on the instrument panel).

The first control line 80a here plays a retrocontrol role on the pressure exerted by the second control line 80b, which allows stabilising the torque transmitted to the engine 30. Hence, one has a control based on the pressure difference between the two lines 40a, 40b, hence on the pressure difference at the terminals of the machine 30, hence in the most exact manner with respect to the torque provided by the machine 30.

By way of example, the pressure Pb is 16 bars (it tends to make the maximum displacement positive) and the pressure Pa varies between 0 and 16 bars according to the piloting of the limiter 110a (retrocontrol which pilots the displacement between a positive maximum displacement and null displacement). Hence, we always have ΔP>0, thus, meaning that the pump 10 is discharging in positive displacement mode.

Particularly, if a disruption makes the pressure vary in the two supply lines 40a, 40b, the repercussion on the pump 10 is immediate, contrary to systems using (on its own or combined with one of the pressures of the supply lines) the booster pressure Pg to pilot the displacement of the pump 10.

Figures 5A, 5B:
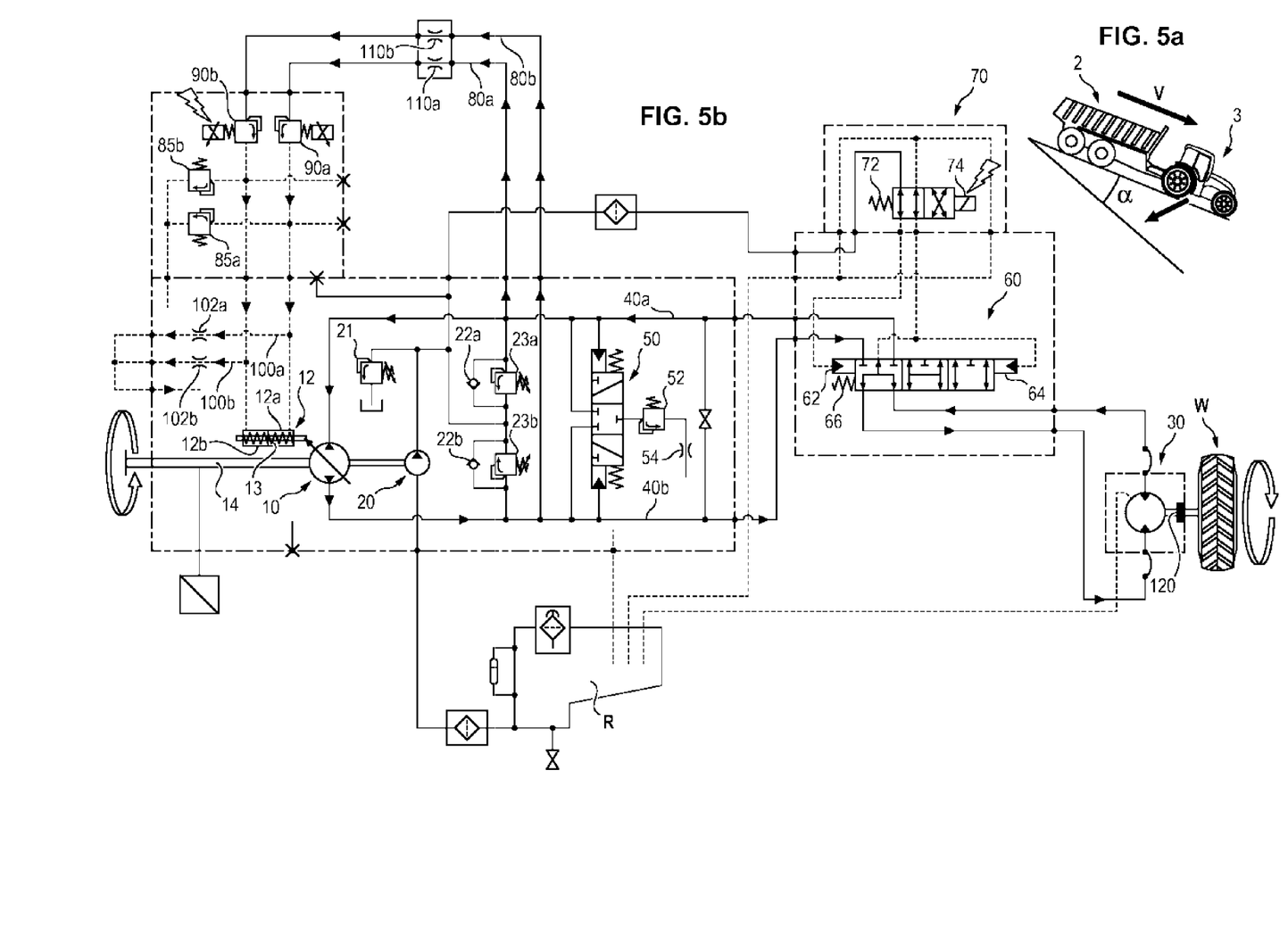

That which has been described in forward gear and in torque contribution is similar in every aspect for the case of FIG. 5a, where the slave vehicle is in reverse gear with torque contribution. In the present case, operating is reversed: the direction of the flow is reversed, the pressures between the two supply lines 40a, 40b are reversed and the piloting of the limiters 90a, 90b is reversed. The circuit illustrated on FIG. 5b shows this.

Figures 6A, 6B:
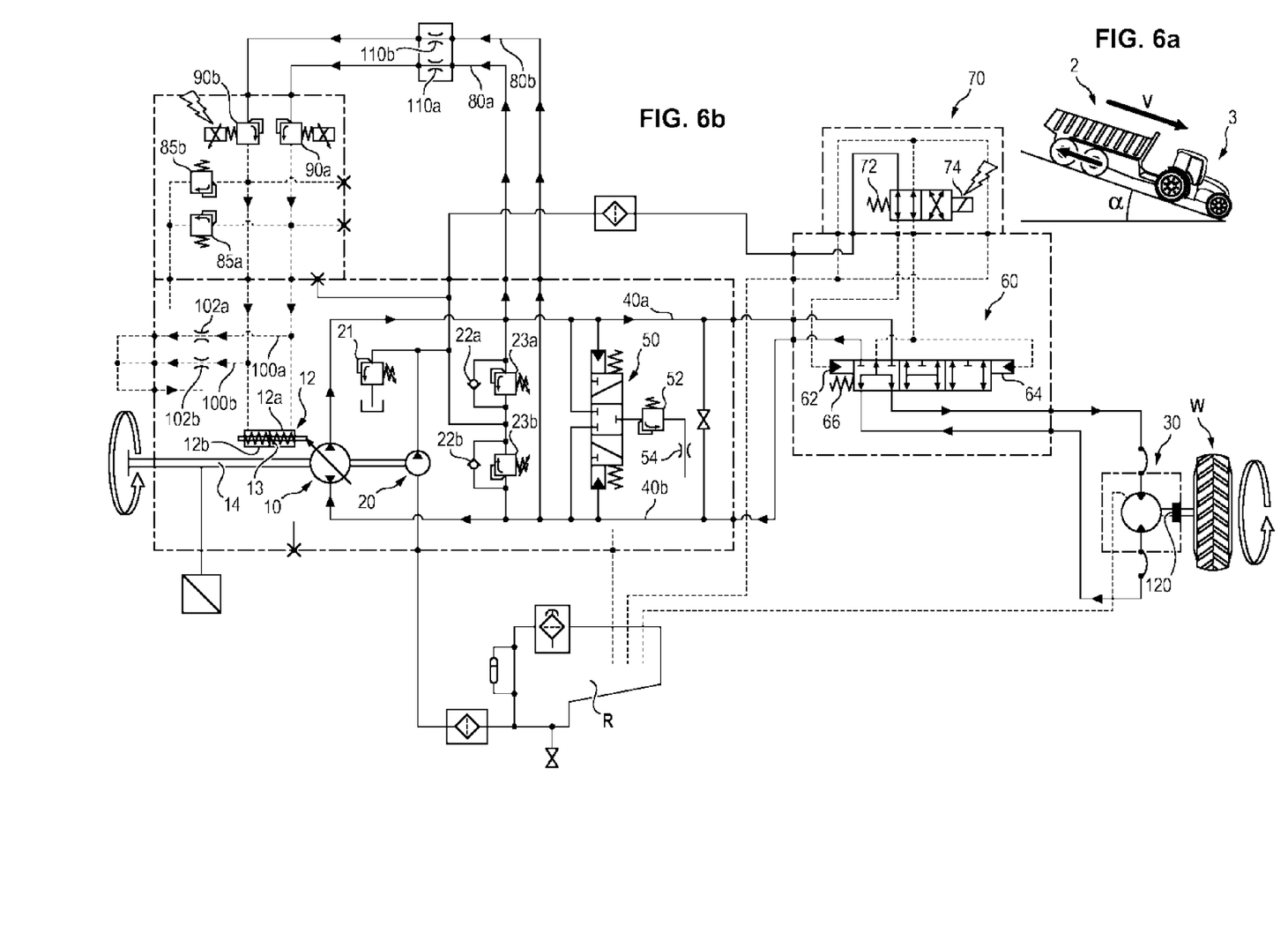

On FIG. 6a, a slave vehicle 2 and a master vehicle 3 in forward gear and in descent are illustrated. In this situation, it is required that the hydraulic machine 30 brakes the wheels (resisting torque or negative torque) and operates hence, as a pump.

For this, as illustrated on FIG. 6b, the pressure limiter 90b of the second supply line 40b is calibrated by the computing unit CALC at a specific value, which directly determines the resisting torque which one wishes to impart to the wheels W. The other limiter 90a is decalibrated hence, in the absence of pressure in the line 100b, the pump 10 displacement would become negative, which should not occur considering that the vehicle is still in forward gear.

As a result, the calibration of the limiter 90b is carried out such that the pressure Pb remains higher than or equal to the pressure Pa (ΔP is positive or zero whatever happens).

When increasing the calibration of the limiter 90b, the pressure in the second control chamber 12b decreases (it is worth reminding that the pressure downstream of the limiter corresponds to the pressure upstream minus the calibration value, modulo the nozzle bridge).

Therefore, the pump 10 displacement tends to decrease (but it should remain positive because the vehicle is in forward gear). As the speed of the engine 30 is determined by the speed of the master vehicle, the consequence of the drop in the displacement is the creation of an overpressure in the second supply line 40b: the hydraulic machine 30, driven by the wheel W takes on the function of a pump and the pump 10 thus operates as an engine brake.

The overpressure in the second supply line 40b increases until the pressures Pa and Pb in the control chamber 12a, 12b find a break-even point with the return means 13, such that the flow of the pump 10 allows maintaining required pressure in the supply lines 40a, 40b. As the flow stabilises, the pressure variation between the two supply lines 40a, 40b also stabilises. In as far as the pressure in the control chamber 12b directly depends on the calibration value of the limiter 90b, the calibration value of the limiter 90b allows to regulate the value of the resisting torque.

The second control line 80b plays a retrocontrol role on the pressure exerted by the first control line 80a which enables to stabilise the resisting torque of the engine 30.

By way of example, the pressure Pa is of 16 bars (it tends to make the maximum displacement negative) and the pressure Pb varies between 16 and 32 bars according to the piloting of the limiter 110b (retrocontrol which pilots the displacement between a positive maximum displacement and a null displacement). We still have ΔP=Pb−Pa positive or zero.

It is also worth noting that the piloting value of the limiter 90b in the forward gear in retention configuration of FIG. 5b is not identical to the piloting value of the limiter 90a in the forward gear torque contribution configuration of FIG. 4b.

In the same manner, we have a control based on the difference in pressure between the two lines 40a, 40b, hence, on the difference in pressure at the terminals of the pump 10, hence in the most exact manner with respect to the resisting torque provided by the pump 10.

Particularly, if a disruption causes the pressure to vary in one of the two lines, the repercussion on the pump 10 is immediate, contrary to systems using (alone or combined with one of the pressures of the supply lines) the booster pressure Pg to pilot the displacement of the pump 10.

Figures 7A, 7B:
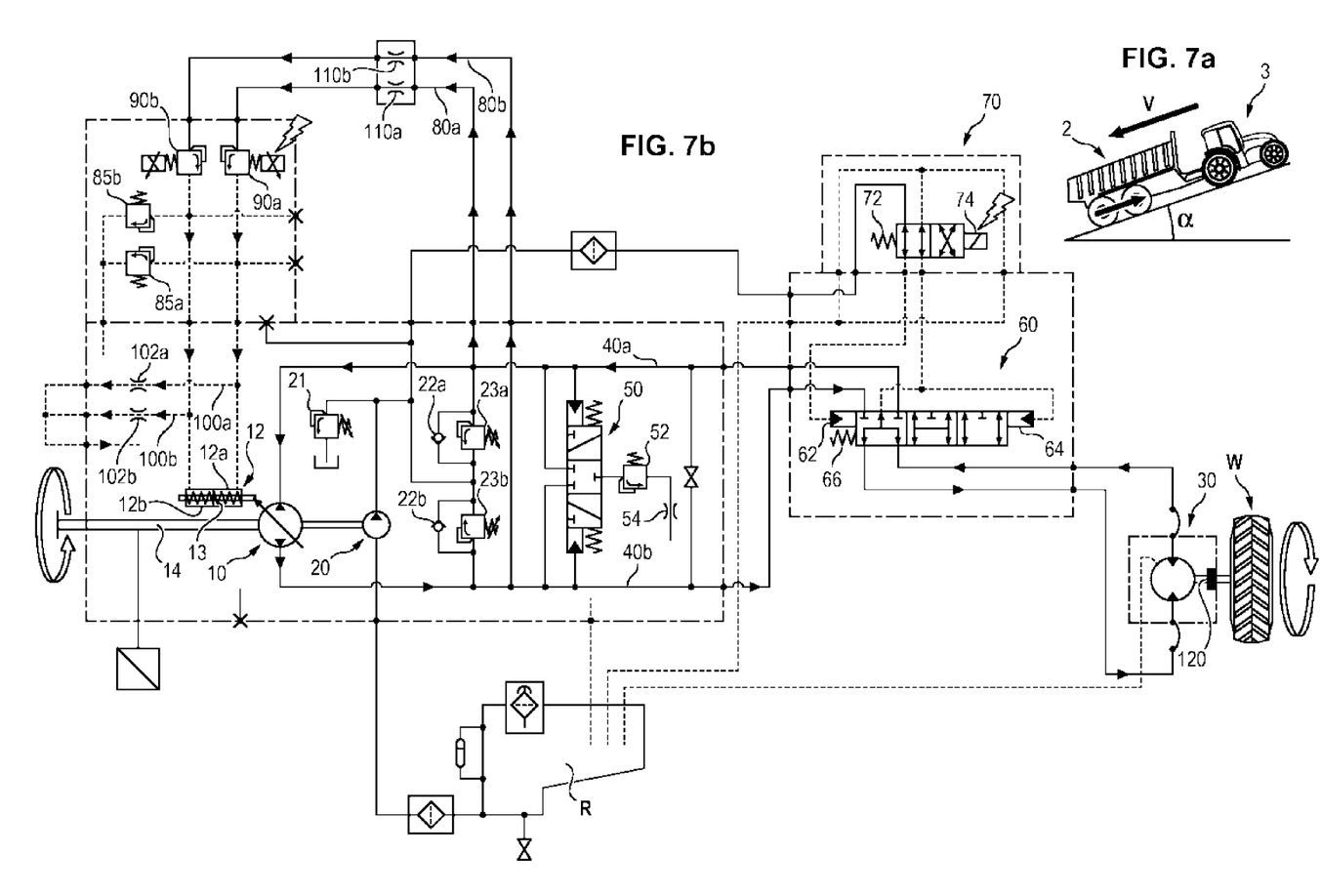

What has been described in forward gear and in torque control is similar in every aspect for the case of FIG. 7a, where the slave vehicle is in reverse gear with torque withdrawal (for example in descent). In the present case, the operation is reversed: the direction of the flow is reversed, the pressures between the two supply lines 40a, 40b are reversed, the piloting of the limiters 90a, 90b. The circuit illustrated on FIG. 7b shows this.

The situations of torque contribution and resisting torque are generally associated with ascents or descents (defined according to the forward gear direction of the vehicle). A solution that allows piloting the calibration of the limiters 90a, 90b is to provide sensors. These sensors can be force sensors, for example tensile force between the two vehicles, or drawbar pull sensor (or coupler base plate), or an inclinometer sensor which detects the inclination direction of the vehicle and which allows to identify whether the slave vehicle is descending or ascending, or other sensors linked to the load on the slave vehicle (illustrated by 120 on FIG. 1), or other sensors that determine the direction of the force, or load sensors linked to the sinking level of the suspensions.

The data recovered by the sensor or sensors is transmitted to the computing unit CALC which processes them, to then electrically pilot the limiters 90a, 90b.

In a general manner, the computing unit CALC does not receive or determine that an indication of the torque that one wishes to exert, and in no case receives a wheel speed indication which would impose pump displacement. The computing unit CALC determines the calibration of the limiters 90a, 90b, and does not pilot the pump by determining its displacement or a position of the pump plate, and does not use a position indication of the pump plate or a recopy position indicator of the pump plate. Thus, there is no speed piloting, but only in torque.

For example, whatever the status of the load, or the expansion, or sinking in the ground, or the diameter of the wheels of the slave vehicle, the flow of the pump 10 will always be adjusted to provide the required torque (positive or resisting) for the hydraulic machine 30, or on the entire speed range of the vehicles.

The device presented here hence, allows to be a follower and to adapt to the requirements of the slave vehicle, whatever the bearing conditions. Furthermore, the adaptation of the displacement is carried out immediately and precisely due to the fact that it depends on the pressures in the two supply lines 40a, 40b in a simultaneous manner.

The master and slave machines can respectively be: a farming tractor and a trailer, a farming tractor and a towed vehicle (for example another tractor and a plough on wheels), a lorry tractor (for the road or a construction site) and its trailer (semi-trailer), a lorry (for the road or for a construction site) and a trailer car (a road train), a first axle of a lorry (engine axle of the lorry) and an additional hydraulic axle (bearing axle of the lorry).

In another embodiment, the described device is applied in the same manner to a non-slave vehicle, that is to say, a fully motorised vehicle piloted by an operator. In this embodiment, the computing unit CALC receives torque or speed instructions from the operator and converts them into calibration instructions for the limiters 90a, 90b. Thus, a vehicle can be motorised (one or several axles) while maintaining a good follow-up torque control.

The invention claimed is:

1. A hydraulic assistance device comprising:
   a hydraulic machine (30), capable of motorising a wheel (W) of the vehicle,
   a variable displacement pump (10), comprising a double actuating actuator (12) defining two control chambers (12a, 12b), to hydraulically pilot the displacement of said pump (10),
   two supply lines (40a, 40b), which connect the hydraulic machine (30) and the variable displacement pump (10) to form a closed circuit,
   wherein the device further comprises:
   two control lines (80a, 80b), each one sampled respectively on one of the two supply lines (40a, 40b) and configured to respectively supply one of the two control chambers (12a, 12b),
   two electrically calibratable pressure limiters (90a, 90b) respectively arranged on the two control lines (80a, 80b).

2. The hydraulic assistance device according to claim 1, wherein the two pressure limiters (90a, 90b) are calibrated to let the pressurised oil go through simultaneously.

3. The hydraulic assistance device according to claim 1, wherein the two pressure limiters (90a, 90b) are calibratable starting from a value ranging between 0 and 5 bars and preferably starting from 0 bar.

4. The hydraulic assistance device according to claim 1, wherein the pressure limiters (90a, 90b) are calibrated at their minimum value when they are not piloted electrically.

5. The hydraulic assistance device according to claim 1, wherein the control lines (80a, 80b) each comprise a sampling nozzle upstream of the pressure limiters (90a, 90b) so that the control lines (80a, 80b) carry out a tapping on the supply lines (40a, 40b).

6. The hydraulic assistance device according to claim 1, wherein the control lines (80a, 80b) each comprise a leakage nozzle downstream of the pressure limiter (90a, 90b), connected to a tank (R) via a tapping.

7. The hydraulic assistance device according to claim 1, wherein the variable displacement pump (10) is driven by a power take-off (14).

8. The hydraulic assistance device according to claim 1, further comprising an engagement valve (60), arranged on the supply lines (40a, 40b) to clutch or unclutch the hydraulic machine (30).

9. The hydraulic assistance device according to claim 1, further comprising a booster pump (20) and a control valve (70), adapted to hydraulically pilot the engagement valve (60) from the pressure of the booster pump (Pg).

10. The hydraulic assistance device according to claim 1, comprising a computing unit (CALC), said computing unit (CALC) allowing to pilot the electrically calibratable flow limiters (90a, 90b).

11. The hydraulic assistance device according to claim 10, wherein the computing unit (CALC) is configured to pilot the pressure limiter (90a, 90b) connected to the highest pressure supply line (40a, 40b) between the two supply lines (40a, 40b).

12. The hydraulic assistance device according to claim 10, for a non-slave vehicle, wherein the computing unit (CALC) receives speed or torque instructions.

13. A method according to claim 12, wherein the choice of the pressure limiter (90a, 90b) to calibrate and/or its calibrating value is performed according to the data obtained by a sensor.

14. The hydraulic assistance device according to claim 10, wherein the computing unit (CALC) is configured to simultaneously pilot the two pressure limiters (90a, 90b) or to simultaneously not pilot the two pressure limiters (90a, 90b).

15. The hydraulic assistance device according to claim 1, for a slave vehicle.

16. A vehicle comprising a device according to claim 1.

17. A pair of vehicles comprising a master vehicle (3) to which is fastened a slave vehicle (2) according to claim 16, for example two vehicles connected by a coupling or two axles of a vehicle.

18. The pair of vehicles according to claim 17, wherein the master vehicle (3) comprises a power take-off (14) for supplying the variable displacement hydraulic pump (10) of the slave vehicle (2).

19. A hydraulic assistance method using a device according to a pair of vehicles according to claim 18, comprising the following steps:
   piloting at least one of the electrically calibratable pressure limiters (90a, 90b).

20. A hydraulic assistance method using a device according to a pair of vehicles according to claim 17, comprising the following steps:
   piloting at least one of the electrically calibratable pressure limiters (90a, 90b).

21. A hydraulic assistance method using a vehicle according to claim 16, comprising the following steps:
   piloting at least one of the electrically calibratable pressure limiters (90a, 90b).

22. A hydraulic assistance method using a device according to claim 1, comprising the following steps:
   piloting at least one of the electrically calibratable pressure limiters (90a, 90b).

23. A method according to claim 22, comprising the following steps:
   unpiloting the two pressure limiters (90a, 90b),
   clutching the hydraulic machine (30),
   piloting only one of the two pressure limiters (90a, 90b).

* * * * *